Feb. 13, 1945.   P. E. RICHMOND ET AL   2,369,178
SEALED BALL BEARING REGREASING DEVICE
Filed May 6, 1944
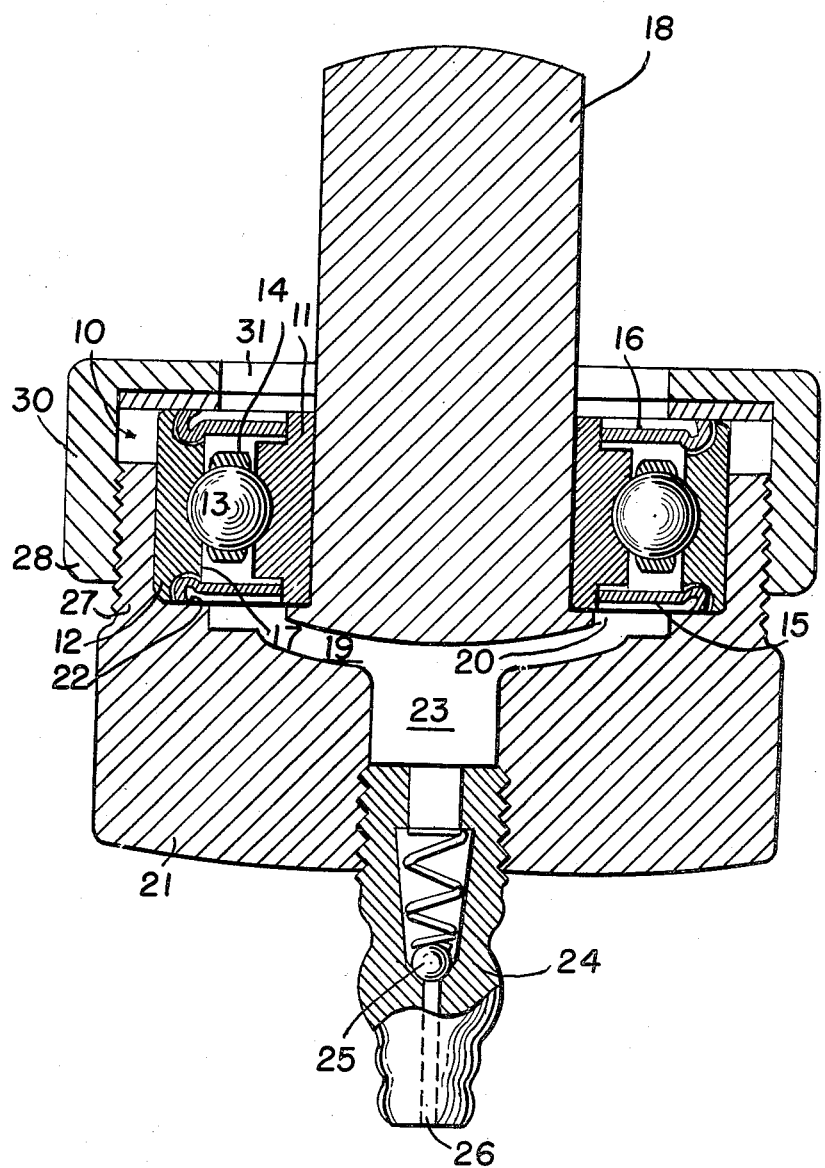
Inventor
PURRIS E. RICHMOND
DONN J. GRISWOLD
By P. E. Bush
Attorney Patented Feb. 13, 1945

2,369,178

UNITED STATES PATENT OFFICE 2,369,178

SEALED BALL-BEARING REGREASING DEVICE

Purris E. Richmond, Port Orchard, and Donn J. Griswold, Bremerton, Wash.

Application May 6, 1944, Serial No. 534,516

3 Claims. (Cl. 184—1)

(Granted under the act of March 3, 1883, as amended April 30, 1928; 370 O. G. 757)

This invention relates to a sealed ball bearing regreasing device and has for an object to provide a valved coupling arrangement for temporarily connecting a sealed ball bearing to a high pressure grease gun, enabling a new supply of grease to be forced into the sealed ball bearing.

A further object of this invention is to provide a means for forcing a new supply of grease into a sealed ball bearing, that is, into a ball bearing of the type that is ordinarily not designed to receive a new supply of grease, and wherein it is generally necessary to discard the used ball bearing in favor of a new ball bearing. With this invention, such ordinarily discardable ball bearings are forcibly repacked with new grease, thereby multiplying the life period of such sealed ball bearing.

With the foregoing and other objects in view, one form of the invention consists in the construction, combination and arrangement of the parts hereinafter described and illustrated in the drawing, in which:

The figure is a sectional view of this invention applied to a sealed ball bearing.

There is shown at 10 a sealed ball bearing with the usual inner bearing ring 11 and the usual outer bearing ring 12, with the bearing balls 13 mounted in the cage 14. The usual sealing rings 15 and 16 mounted on opposite sides of the bearing 10 and secured in recesses 17 in the outer bearing ring 12 serve to retain the original supply of grease therein for quite a long time, many times longer than the bearing would remain greased if it were an open bearing. In one example of service, an open bearing needs to be greased weekly, while the sealed bearing lasts for six months.

However, at the end of such long period, the sealed bearing is customarily discarded, for previous to this invention, no means existed for adding a new supply of grease to the sealed bearing 10. This invention includes a plug 18 for filling the space within the inner ring 11. The plug 18 is provided with a flange 20 adapted to abut against the end of the ring 11 and prevent it from being forced therethrough. A cup 21 is provided with an annulus 22 for abutting the end of the outer ring 12 and providing an annular space 19 leading from the sealing ring 15 to a central aperture 23 which is provided in turn with a conventional high pressure grease nipple 24. The nipple is provided with the usual spring pressed ball valve 25 permitting grease to pass thereby from the nipple opening 26 to the aperture 23.

Extending from the annulus 22 is an externally threaded flange 27 adapted to cooperate with the internally threaded flange 28 of a cup 30 having a central opening 31 of substantially greater diameter than the plug 18, thus leaving a space for excess grease, or discarded used grease, to make its exit from the bearing 10. Obviously, the relative positions of the flanges 27 and 28 may be interchanged.

In operation, the plug 18 is placed through the opening in the inner ring 11 of the sealed ball bearing, and then the cups 21 and 30 are threaded together about the bearing 10. Next, any conventional type of high pressure grease gun is fitted against the grease nipple 24, and grease is forced through the nipple 24 under sufficient pressure to cause it to pass by the nearer sealing ring 15 into and filling the bearing space about the balls 13 and then past the further sealing ring 16, showing that the bearing has been fully regreased. Obviously, any warnout grease would be first forced out, and the pressure should be applied until clean grease is visible through the opening 31.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

What is claimed is:

1. A valved coupling for temporarily connecting a high pressure grease gun to a sealed ball bearing comprising a pair of apertured cups, means for temporarily securing said cups together about the opposite sides of a sealed ball bearing, a plug adapted to fill the opening through the bearing, the aperture in one of the cups being larger than said plug, and a grease nipple mounting in the aperture of said other cup, said nipple mounting cup having an annulus adapted to abut the outer ring of the sealed bearing and space said cup from the ball space and thus provide a grease passageway from said nipple to the ball space.

2. A valved coupling for temporarily connecting a high pressure grease gun to a sealed ball bearing comprising a pair of apertured cups, means for temporarily securing said cups together about the opposite sides of a sealed ball bearing, a plug adapted to fill the opening through the bearing, the aperture in one of the cups being larger than said plug, and a grease nipple mounting in the aperture of said other cup, said nipple mounting cup having an annulus adapted to abut the outer ring of the sealed bearing and space said cup from the ball space and thus provide a grease passageway from said nipple to the ball space, said temporary cup securing means comprising an externally threaded flange on one cup and a mating internally threaded flange on the other cup.

3. Means for regreasing a sealed ball bearing comprising a pair of mating cups adapted to temporarily receive the sealed ball bearing therebetween, means on one of said cups for abutting the outer ring of the bearing and spacing said one cup from the ball space to provide a passageway to the sealing means of the ball space, an aperture through said one cup connecting to said passageway, a grease nipple secured in said aperture, said other cup having a grease escape aperture, and means for temporarily plugging the opening through the inner ring of the bearing.

PURRIS E. RICHMOND.
DONN J. GRISWOLD.